US006124232A

United States Patent [19]

Chang et al.

[11] Patent Number: 6,124,232

[45] Date of Patent: Sep. 26, 2000

[54] METHOD FOR PREPARING AN ACIDIC SOLID OXIDE

[75] Inventors: Clarence D. Chang, Princeton, N.J.; Charles T. Kresge, Midland, Mich.; Jose G. Santiesteban; James C. Vartuli, both of West Chester, Pa.

[73] Assignee: Mobil Oil Corporation, Fairfax, Va.

[21] Appl. No.: 09/357,503

[22] Filed: Jul. 20, 1998

Related U.S. Application Data

[63] Continuation-in-part of application No. 08/790,871, Feb. 3, 1997, abandoned, which is a continuation-in-part of application No. 08/733,058, Oct. 16, 1996, abandoned.

[51] Int. Cl.$^{7}$ .................................................... B01J 21/06

[52] U.S. Cl. ......................... 502/308; 502/305; 502/309; 502/310

[58] Field of Search .................................... 502/305, 308, 502/309, 310

[56] References Cited

U.S. PATENT DOCUMENTS

| | | | |
|---|---|---|---|
| 5,510,309 | 4/1996 | Chang et al. | 502/308 |
| 5,780,382 | 7/1998 | Chang et al. | 502/308 |
| 5,854,170 | 12/1998 | Chang et al. | 502/308 |

*Primary Examiner*—Elizabeth D. Wood
*Attorney, Agent, or Firm*—Malcolm D. Keen

[57] ABSTRACT

There is provided a method for preparing an acidic solid oxide having a reduced particle density, where the acidic solid oxide comprises a Group IVB metal oxide modified with an anion or oxyanion of a Group VIB metal. An example of this acidic solid oxide is zirconia modified with tungstate. The acidic solid oxide having a reduced particle density is prepared by coprecipitating the Group IVB metal oxide along with the anion or oxyanion of the Group VIB metal in the presence of a salt. This acidic solid oxide is particularly effective as a paraffin isomerization catalyst.

20 Claims, No Drawings

METHOD FOR PREPARING AN ACIDIC SOLID OXIDE

This application is a continuation-in-part of Ser. No. 08/790,871, filed Feb. 3, 1997, which is a continuation-in-part of Ser. No. 08/733,058 filed Oct. 16, 1996 and now abandoned.

FIELD OF THE INVENTION

The present invention is directed to a method for preparing an acidic solid oxide having a reduced particle density, where the acidic solid oxide comprises a Group IVB metal oxide modified with an anion or oxyanion of a Group VIB metal. The acidic solid oxide having a reduced particle density is prepared by coprecipitating the Group IVB metal oxide along with the anion or oxyanion of the Group VIB metal in the presence of a salt, specifically ammonium sulfate. This acidic solid oxide may be used as a catalyst, for example, to isomerize $C_4$ to $C_8$ paraffins, such as pentane.

BACKGROUND OF THE INVENTION

Tungsten-modified zirconia catalysts are known acidic solid oxide catalysts. U.S. Pat. No. 5,510,309 describes a method for preparing such a modified solid oxide catalyst by coprecipitating a Group IVB metal oxide with an oxyanion of a Group VIB metal.

The generation of acid activity in solid oxide catalysts such as tungsten-modified zirconia catalysts requires calcination of the catalyst at temperatures of about 800° C. and higher. The high calcination temperature, however, causes a significant loss of surface area and results in a catalyst having a high particle density. Therefore, it is desirable to maximize the surface area and reduce the particle density of the catalyst, without adversely affecting the activity of the catalyst.

Ammonium sulfate has been used to prepare sulfated zirconia, a known acidic solid oxide catalyst, by impregnating zirconia with the ammonium sulfate, followed by calcination/activation at a temperature of about 600° C. The sulfur content of the sulfated zirconia catalysts is in the range of 3 to 6 percent by weight.

No prior art reference, however, teaches a method for preparing an acidic solid oxide catalyst comprising the steps of combining sulfate and tungstate ions during coprecipitation, followed by removal of the sulfate ions to obtain an acidic solid oxide catalyst having a reduced particle density. For example, unlike the catalyst described in U.S. Pat. No. 4,918,041, the resultant catalyst of the present method is essentially free of sulfate ions.

DETAILED DESCRIPTION OF THE INVENTION

The present method produces an acidic solid oxide catalyst having a reduced particle density. Specifically, the particle density of the catalyst can be reduced by a factor of about two by coprecipitating a Group IVB metal oxide along with an anion or oxyanion of a Group VIB metal in the presence of a salt, without any adverse effect on the isomerization activity of the catalyst.

The present method comprises the steps of (1) combining a first liquid solution comprising a source of a Group IVB metal oxide and a salt, specifically ammonium sulfate, and a second liquid solution comprising a source of an anion or oxyanion of a Group VIB metal, under conditions sufficient to cause precipitation of the catalyst, from the combined liquid solution, (2) filtering the catalyst from the liquid and washing it and (3) calcining the catalyst at a temperature that is sufficiently high to remove sulfate ions from the catalyst. The source of the Group IVB metal oxide, the source of the anion or oxyanion of the Group VIB metal and the salt may also be combined in a single liquid solution, which may then be subjected to conditions sufficient to cause precipitation of the catalyst, such as by the addition of a precipitating reagent to the solution. Examples of the precipitating reagent include ammonium hydroxide and alkylammonium hydroxide. Water is a preferred solvent for these solutions.

The amount of ammonium sulfate used in the present method is such that the ratio of sulfate anion to tungsten in solution is from about 0.1 to 20, and preferably from about 1 to 9.

The temperature at which the liquid solution is maintained during precipitation may be less than about 200° C., e.g., from about 0° to 200° C. This liquid solution may be maintained at ambient temperature (e.g., about 25 to 30° C.), or may be cooled or heated. A particular range of such temperatures is from about 200° to 100° C.

The catalyst is recovered from the liquid solution by filtration, then is washed, and finally dried. Calcination of the catalyst is then conducted, preferably in an oxidizing atmosphere, at about atmospheric pressure to 6890 kPa (about 1000 psi), from about 750° to 850° C., and preferably from about 800° to 850° C. The calcination time may be up to 48 hours, e.g., for about 0.5 to 24 hours, e.g., for about 1.0 to 10 hours.

The resultant catalyst comprises an oxide of a Group IVB metal modified with an anion or oxyanion of a Group VIB metal, and is essentially free of sulfate ions, e.g., containing no more than about 0.1 percent by weight sulfur based on the total weight of the calcined catalyst.

The Group IVB metal of the acidic solid oxide catalyst may be zirconium, titanium or hafnium and the Group VIB metal may be tungsten, molybdenum or chromium. Preferably, the Group IVB metal is zirconium or titanium and the Group VIB metal is tungsten or molybdenum. The Group IVB and Group VIB metal species of the acidic solid oxide catalyst are not limited to any particular valence state, and may be present in any positive oxidation state.

Suitable sources of the Group IVB metal oxide include salt solutions, such as oxychloride, chloride, or nitrate, etc., particularly of zirconium or titanium. The salt solution is preferably water soluble and capable of forming a hydroxide precipitate upon addition of a base, such as ammonium hydroxide or alkylammonium hydroxide. Alkoxides may also be used as precursors or sources of the Group IVB metal oxide, which may be hydrolyzed with water to form the hydroxide precipitate. Examples of such alkoxides include zirconium n-propoxide and titanium i-propoxide.

Suitable sources for the anion or oxyanion of the Group VIB metal, such as tungstate or molybdate, include but are not limited to ammonium metatungstate or metamolybdate, tungsten or molybdenum chloride, tungsten or molybdenum carbonyl, tungstic or molybdic acid, and sodium tungstate or molybdate. Tungstate is the preferred Group VIB metal anion or oxyanion.

Elemental analysis of the acidic solid oxide catalyst will reveal the presence of a Group IVB metal, a Group VIB metal and oxygen. The amount of oxygen measured in such an analysis will depend on a number of factors, such as the valence state of the Group IVB and Group VIB metals, and the moisture content, etc. Accordingly, in characterizing the composition of the acidic solid oxide catalyst, it is best not to be restricted by any particular quantities of oxygen. In functional terms, the amount of Group VIB metal anion or oxyanion in the acidic solid oxide catalyst may be expressed as that amount which increases the acidity of the Group IVB metal oxide. This amount is referred to herein as an acidity increasing amount. Elemental analysis of the acidic solid oxide catalyst may be used to determine the relative amounts of Group IVB metal and Group VIB metal in the catalyst. From these amounts, the molar ratio $XO_2/YO_3$ may be calculated, where X is the Group IVB metal (assumed to be in the form $XO_2$) and Y is the Group VIB metal (assumed to be in the form of $YO_3$). However, these forms of oxides, e.g., $XO_2$ and $YO_3$, may not actually exist, and are referred to herein simply for the purpose of calculating relative quantities of the Group IVB and Group VIB metals in the acidic solid oxide catalyst. The acidic solid oxide catalyst may have calculated molar ratios, expressed in the form of $XO_2/YO_3$, of up to 1000, e.g., up to 300, e.g., from 2 to 100, e.g., from 4 to 30.

An alternative embodiment of the resultant catalyst includes an iron and/or manganese component therein. Suitable sources for the iron and/or manganese components include iron halide, sulfate or nitrate and manganese nitrate, acetate, halide or carbonate. The iron and/or manganese component may be coprecipitated from the liquid solution, along with the Group IVB metal oxide and the salt, and the anion or oxyanion of the Group VIB metal.

The amount of iron and/or manganese that is incorporated into the present catalyst may be expressed in terms of calculated molar ratios of oxides, based upon the elemental analysis of the acidic solid oxide catalyst for the Group IVB metal, X, along with Fe and Mn. More particularly, the catalyst may have a calculated molar ratio, expressed in terms of $XO_2/(Fe_2O_3+MnO_2)$, of, for example, from 10 to 5000. It will be appreciated, however, that Fe need not be in the form of $Fe_2O_3$ and Mn need not be in the form of $MnO_2$. More particularly, at least a portion of these components may be in the form of free metals or other combined forms than $Fe_2O_3$ or $MnO_2$, e.g., as salts with elements other than oxygen, in any possible valence state for X, Fe or Mn. Accordingly, the expression, $XO_2/(Fe_2O_3+MnO_2)$, is given merely for the purpose of expressing calculated quantities of X, Fe and Mn, and is not to be construed as being limited of the actual form of these elements in the catalyst.

It may be desirable to combine a hydrogenation/dehydrogenation component therewith. The hydrogenation/dehydrogenation component may be derived from Group VIII metals, such as platinum, iridium, osmium, palladium, rhodium, ruthenium, nickel, cobalt, iron and mixtures of two or more thereof. These components may be mixed with components derived from Group IVA metals, preferably Sn, and/or components derived from Group VIIB metals, preferably rhenium and manganese. Salts containing these metals may be used as a source for the hydrogenation/dehydrogenation component. The metal-containing salt is preferably water soluble. Examples of such salts include chloroplatinic acid, tetraamineplatinum complexes, platinum chloride, tin sulfate and tin chloride. The hydrogenation/dehydrogenation component may be added to the catalyst by methods known in the art, such as ion exchange, impregnation or physical admixture. Alternatively, the hydrogenation/dehydrogenation component may be coprecipitated from the liquid solution, along with the Group IVB metal oxide and the salt, and the anion or oxyanion of the Group VIB metal.

The amount of the hydrogenation/dehydrogenation component may be that amount which imparts or increases the catalytic ability of the catalyst to hydrogenate or dehydrogenate an organic compound, under sufficient hydrogenation or dehydrogenation conditions. This amount is referred to herein as a catalytic amount. Quantitatively speaking, the catalyst may comprise, for example, from about 0.001 to 5 wt. %, e.g., from about 0.01 to 1.0 wt. %, of the hydrogenation/dehydrogenation component, based on the total weight of the catalyst, especially when this component is a noble metal.

When a source of hydrogenation metal, such as $H_2PtCl_6$, is used as a source of a hydrogenation/dehydrogenation component in the catalyst, it may be desirable to subject the catalyst to extended reducing conditions. In particular, the catalyst may be contacted with hydrogen at elevated temperatures. These elevated temperatures may be from about 1000 to 500° C., e.g., about 250° C., e.g., about 300° C., at atmospheric pressure. The duration of this contact may be as short as one hour or even 0.1 hour. However, extended contact may also be used. This extended contact may take place for a period of 6 hours or greater, e.g., about 18 hours. The catalyst may be contacted with hydrogen in the presence or absence of a hydrocarbon feed. For example, the activity of the catalyst may be increased, in situ, during the course of a reaction when a hydrocarbon feed and hydrogen are passed over the catalyst at elevated temperatures, where the hydrogen $H_2$ to hydrocarbon HC molar ratio is about 0.1:1 to about 10:1.

The liquid solution from which the catalyst is precipitated may optionally comprise a solid support material, in which case the catalyst may be precipitated directly onto the solid support material. Examples of such support materials include the material designated M41S, which is described in U.S. Pat. No. 5,102,643. A particular example of such an M41S material is a material designated MCM-41, which is described in U.S. Pat. No. 5,098,684.

The catalyst may also be composited with a matrix material or binder using conventional matrix materials, such as alumina, silica-alumina and silica. Other matrix materials, such as titania, zirconia and other metal oxides, molecular sieves, and clay, may also be used. The weight ratio of active catalyst to matrix material may be from 90:10 to 10:90, e.g., from 80:20 to 50:50. The catalyst may be composited with the matrix material by conventional means, such as mulling the components together, followed by extrusion.

Other elements, such as Group IA alkali or Group IIA alkaline earth compounds, may be added to the catalyst to alter catalytic properties. The addition of such alkali or alkaline earth compounds to the catalyst may enhance the catalytic properties of components thereof, e.g., Pt or W, in terms of their ability to function as a hydrogenation/dehydrogenation component or an acid component.

Higher isomerization activity may be provided by the inclusion of an additional material having Lewis or Bronsted acid activity in the catalyst, especially when the catalyst comprises a porous binder material. For this purpose, both liquid and solid acid materials may be used. Examples of suitable additional acidic materials include aluminum trichloride, boron trifluoride and complexes of boron trifluoride, for example, with water, lower alcohols or esters.

EXAMPLE 1

Five hundred grams of $ZrOCl_2.8H_2O$ were dissolved with stirring in 6.5 liters of distilled water. To this solution was added a mixture of 500 grams of distilled water and 7.5 grams of $FeSO_4.7H_2O$. Finally a solution containing 263 grams of conc. $NH_4OH$, 500 ml of distilled $H_2O$, and 54 grams of $(NH_4)_6H_2W_{12}O_{40}.xH_2O$ was added dropwise to the iron/zirconium solution over a 30–45 minute period. The pH of the final composite was adjusted to approximately 9 by the addition of concentrated ammonium hydroxide. The synthesis composition, in terms of the Zr/W/Fe molar ratios was 7.1/1/0.12. This slurry was then put in polypropylene bottles and placed in a steambox (100° C.) for 72 hours. The product formed was recovered by filtration, washed with excess water, and dried overnight at 85° C. A sample of this catalyst was calcined at 830° C. in flowing air for 3 hours. The particle density of this sample was 1.31 g/cc.

EXAMPLE 2

Five hundred grams of $ZrOCl_2.8H_2O$ and 26.4 grams of $(NH_4)_2SO_4$ were dissolved with stirring in 4.0 liters of distilled water. To this solution was added two solutions: one of 54 grams of $(NH_4)_6H_2W_{12}O_{40}.xH_2O$ dissolved in 500 grams of distilled water and the second of 7.5 grams of $FeSO_4.7H_2O$ dissolved in 500 grams of distilled water. Finally a solution containing 263 grams of conc. $NH_4OH$ in 2.5 liters of distilled $H_2O$ was added dropwise over a 30–45 minute period. The pH of the final composite was adjusted to approximately 9 by the addition of concentrated ammonium hydroxide. The synthesis composition, in terms of the Zr/W/Fe molar ratios was 7.1/1/0.12. This slurry was then put in polypropylene bottles and placed in a steambox (100° C.) for 72 hours. The product formed was recovered by filtration, washed with excess water, and dried overnight at 85° C. A sample of this catalyst was calcined at 830° C. in flowing air for 3 hours. The sulfur analyses of the calcined material was <0.05%. The particle density of this sample was 0.99 g/cc.

EXAMPLE 3

Five hundred grams of $ZrOCl_2.8H_2O$ and 132 grams of $(NH_4)_2SO_4$ were dissolved with stirring in 4.0 liters of distilled water. To this solution was added two solutions: one of 54 grams of $(NH_4)_6H_2W_{12}O_{40}.xH_20$ dissolved in 500 grams of distilled water and the second of 7.5 grams of $FeSO_4.7H_2O$ dissolved in 500 grams of distilled water. Finally a solution containing 263 grams of conc. $NH_4OH$ in 2.5 liters of distilled $H_2O$ was added dropwise over a 30–45 minute period. The pH of the final composite was adjusted to approximately 9 by the addition of concentrated ammonium hydroxide. The synthesis composition, in terms of the Zr/W/Fe molar ratios was 7.1/1/0.12. This slurry was then put in polypropylene bottles and placed in a steambox (100° C.) for 72 hours. The product formed was recovered by filtration, washed with excess water, and dried overnight at 85° C. A sample of this catalyst was calcined at 830° C. in flowing air for 3 hours. The sulfur analyses of the calcined material was 22 ppm. The particle density of this sample was 0.57 g/cc.

EXAMPLE 4

Five hundred grams of $ZrOCl_2.8H_2O$ and 264 grams of $(NH_4)_2SO_4$ were dissolved with stirring in 4.0 liters of distilled water. To this solution was added two solutions: one of 54 grams of $(NH_4)_6H_{12}O_{40}.xH_2O$ dissolved in 500 grams of distilled water and the second of 7.5 grams of $FeSO_4.7H_20$ dissolved in 500 grams of distilled water. Finally a solution containing 263 grams of conc. $NH_4OH$ in 2.5 liters of distilled $H_2O$ was added dropwise over a 30–45 minute period. The pH of the final composite was adjusted to approximately 9 by the addition of concentrated ammonium hydroxide. The synthesis composition, in terms of the Zr/W/Fe molar ratios was 7.1/1/0.12. This slurry was then put in polypropylene bottles and placed in a steambox (100° C.) for 72 hours. The product formed was recovered by filtration, washed with excess water, and dried overnight at 85° C. A sample of this catalyst was calcined at 830° C. in flowing air for 3 hours. The sulfur analyses of the calcined material was <0.02%. The particle density of this sample was 0.63 g/cc.

EXAMPLE 5

Five hundred grams of $ZrOCl_2.8H_2O$ was dissolved with stirring in 4.0 liters of distilled water. To this solution was added two solutions: one of 54 grams of $(NH_4)_6H_2W_{12}O_{40}.xH_2O$ dissolved in 500 grams of distilled water and the second of 7.5 grams of $FeSO_4.7H_2O$ dissolved in 500 grams of distilled water. Finally a solution containing 263 grams of conc. $NH_40H$ in 2.5 liters of distilled $H_2O$ was added dropwise over a 30–45 minute period. The pH of the final composite was adjusted to approximately 9 by the addition of concentrated ammonium hydroxide. The synthesis composition, in terms of the Zr/W/Fe molar ratios was 7.1/1/0.12. This slurry was then put in polypropylene bottles and placed in a steambox (100° C.) for 72 hours. The product formed was recovered by filtration, washed four times with 4 liters of a 0.5 M $(NH_4)_2SO_4$ aqueous solution (the pH of the catalyst/ammonium sulfate slurry was adjusted to 9 by the addition of concentrated ammonium hydroxide), and dried overnight at 85° C. Each ammonium sulfate solution wash exposed the Fe/W/Zr catalyst to an anion/W ratio of 9. A sample of this catalyst was calcined at 830° C. in flowing air for 3 hours. The sulfur analyses of the calcined material was <0.20%. The particle density of this sample was 1.66 g/cc.

EXAMPLE 6

Five hundred grams of $ZrOCl_2.8H_2O$ was dissolved with stirring in 4.0 liters of distilled water. To this solution was added two solutions: one of 54 grams of $(NH_4)_6H_2W_{12}O_{40}.xH_2O$ dissolved in 500 grams of distilled water and the second of 7.5 grams of $FeSO_4.7H_2O$ dissolved in 500 grams of distilled water. Finally a solution containing 263 grams of conc. $NH_4OH$ in 2.5 liters of distilled $H_2O$ was added dropwise over a 30–45 minute period. The pH of the final composite was adjusted to approximately 9 by the addition of concentrated ammonium hydroxide. The synthesis composition, in terms of the Zr/W/Fe molar ratios was 7.1/1/0.12. This slurry was then put in polypropylene bottles and placed in a steambox (100° C.) for 72 hours. The product formed was recovered by filtration, washed four times with 4 liters of a 0.5 M $H_2SO_4$ aqueous solution (the pH of the catalyst/sulfuric acid slurry was 1.0), and dried overnight at 85° C. Each sulfur acid solution wash exposed the Fe/W/Zr catalyst to an anion/W ratio of 9. A sample of this catalyst was calcined at 830° C. in flowing air for 3 hours. The sulfur analyses of the calcined material was 0.04%. The particle density of this sample was 2.10 g/cc.

EXAMPLE 7

Five hundred grams of $ZrOCl_2.8H_2O$ and 19.2 grams of $(NH_4)_2CO_3$ were dissolved with stirring in 4.0 liters of distilled water. To this solution was added two solutions: one of 54 grams of $(NH_4)_6H_2W_{12}O_{40}.xH_2O$ dissolved in 500 grams of distilled water and the second of 7.5 grams of $FeSO_4.7H_2O$ dissolved in 500 grams of distilled water. Finally a solution containing 263 grams of conc. $NH_4OH$ in 2.5 liters of distilled $H_2O$ was added dropwise over a 30–45 minute period. The pH of the final composite was adjusted to approximately 9 by the addition of concentrated ammonium hydroxide. The synthesis composition, in terms of the Zr/W/Fe molar ratios was 7.1/1/0.12. This slurry was then put in polypropylene bottles and placed in a steambox (100° C.) for 72 hours. The product formed was recovered by filtration, washed with excess water, and dried overnight at 85° C. A sample of this catalyst was calcined at 830° C. in flowing air for 3 hours. The sulfur analyses of the calcined material was <0.005%. The particle density of this sample was 1.15 g/cc.

EXAMPLE 8

Five hundred grams of $ZrOCl_2.8H_2O$ and 96 grams of $(NH_4)_2CO_3$ were dissolved with stirring in 4.0 liters of distilled water. To this solution was added two solutions: one of 54 grams of $(NH_4)_6H_2W_{12}O_{40}.xH_2O$ dissolved in 500 grams of distilled water and the second of 7.5 grams of $FeSO_4.7H_2O$ dissolved in 500 grams of distilled water. Finally a solution containing 150 grams of conc. $NH_4OH$ in 2.5 liters of distilled $H_2O$ was added dropwise over a 30–45 minute period. The pH of the final composite was adjusted to approximately 9 by the addition of concentrated ammonium hydroxide. The synthesis composition, in terms of the Zr/W/Fe molar ratios was 7.1/1/0.12. This slurry was then put in polypropylene bottles and placed in a steambox (100° C.) for 72 hours. The product formed was recovered by filtration, washed with excess water, and dried overnight at 85° C. A sample of this catalyst was calcined at 830° C. in flowing air for 3 hours. The sulfur analyses of the calcined material was 18 ppm. The particle density of this sample was 1.65 g/cc.

EXAMPLE 9

Five hundred grams of $ZrOCl_2.8H_2O$ and 15.4 grams of $(NH_4)Ac$ were dissolved with stirring in 4.0 liters of distilled water. To this solution was added two solutions: one of 54 grams of $(NH_4)_6H_2W_{12}O_{40}.xH_2O$ dissolved in 500 grams of distilled water and the second of 7.5 grams of $FeSO_4.7H_2O$ dissolved in 500 grams of distilled water. Finally a solution containing 263 grams of conc. $NH_4OH$ in 2.5 liters of distilled $H_2O$ was added dropwise over a 30–45 minute period. The pH of the final composite was adjusted to approximately 9 by the addition of concentrated ammonium hydroxide. The synthesis composition, in terms of the Zr/W/Fe molar ratios was 7.1/1/0.12. This slurry was then put in polypropylene bottles and placed in a steambox (100° C.) for 72 hours. The product formed was recovered by filtration, washed with excess water, and dried overnight at 85° C. A sample of this catalyst was calcined at 830° C. in flowing air for 3 hours. The sulfur analyses of the calcined material was <0.004%. The particle density of this sample was 1.10 g/cc.

EXAMPLE 10

Five hundred grams of $ZrOCl_2.8H_2O$ and 77 grams of $(NH_4)Ac$ were dissolved with stirring in 4.0 liters of distilled water. To this solution was added two solutions: one of 54 grams of $(NH_4)_6H_2W_{12}O_{40}.xH_2O$ dissolved in 500 grams of distilled water and the second of 7.5 grams of $FeSO_4.7H_2O$ dissolved in 500 grams of distilled water. Finally a solution containing 263 grams of conc. $NH_4OH$ in 2.5 liters of distilled $H_2O$ was added dropwise over a 30–45 minute period. The pH of the final composite was adjusted to approximately 9 by the addition of concentrated ammonium hydroxide. The synthesis composition, in terms of the Zr/W/Fe molar ratios was 7.1/1/0.12. This slurry was then put in polypropylene bottles and placed in a steambox (100° C.) for 72 hours. The product formed was recovered by filtration, washed with excess water, and dried overnight at 85° C. A sample of this catalyst was calcined at 830° C. in flowing air for 3 hours. The sulfur analyses of the calcined material was <0.004%. The particle density of this sample was 1.29 g/cc The effect on the particle density of the resultant catalyst of the salt addition appears to be specific only for the addition of the ammonium sulfate salt as illustrated by the results in Table I.

TABLE I

Bulk Density as a Function of Added Ammonium Salt

| Catalyst Example | Salt added | Anion/W molar ratio | Density[1] grams/cc |
|---|---|---|---|
| 1 | none | — | 1.31 |
| 2 | $(NH_4)_2SO_4$ | 1 | 0.99 |
| 3 | $(NH_4)_2SO_4$ | 5 | 0.57 |
| 4 | $(NH_4)_2SO_4$ | 9 | 0.63 |
| 5 | $(NH_4)_2SO_4$[2] | 9 | 1.66 |
| 6 | $H_2SO_4$[3] | 9 | 2.10 |
| 7 | $(NH_4)_2CO_3$ | 1 | 1.15 |
| 8 | $(NH_4)_2CO_3$ | 5 | 1.65 |
| 9 | $NH_4Ac$ | 1 | 1.10 |
| 10 | $NH_4Ac$ | 5 | 1.29 |

[1]as determined using 14/30 mesh particles
[2]a 0.5M $(NH_4)_2SO_4$ solution wash of the precipitated Fe/W/Zr catalyst
[3]a 0.5M $H_2SO_4$ solution wash of the precipitated Fe/W/Zr catalyst

[1] as determined using 14/30 mesh particles
[2] a 0.5 M $(NH_4)_2SO_4$ solution wash of the precipitated Fe/W/Zr catalyst
[3] a 0.5 M $H_2SO_4$ solution wash of the precipitated Fe/W/Zr catalyst Pentane isomerization activity was very good as illustrated in Table II, which compares the activity of the low density catalyst (Example 3) with that of the higher density catalyst (Example 1). From Table II, it is clearly shown that an isomerization reaction using the catalyst prepared according to the present method in Example 3 required only half the catalyst weight to produce comparable isomerization results obtained from the isomerization reaction using the catalyst of Example 1.

TABLE II

Comparison of Isomerization Activity

| Catalyst | Example 1 | Example 3 |
|---|---|---|
| Cat. volume (14/30 mesh), cc | 4.0 | 4.0 |
| Cat. weight, g | 4.7 | 2.3 |
| Bulk density, g/cc | 1.2 | 0.6 |
| Operating Temp., ° C. | 176 | 176 |
| $iC_5$/total $C_5$'s | 64.9 | 56.3 |
| Rxn rate constant, kv[1] | 2.9 | 2.0 |
| Rxn rate constant, kw[2] | 1.5 | 2.2 |

[1]kv is the first order reversible reaction rate constant based on catalyst volume
[2]kw is the first order reversible reaction rate constant based on catalyst weight

[1] kv is the first order reversible reaction rate constant based on catalyst volume
[2] kw is the first order reversible reaction rate constant based on catalyst weight As clearly seen from the Examples, the resultant catalyst obtained according to the present method has a particle density that is less than the particle density of a catalyst that is prepared in the absence of the ammonium sulfate salt. The addition of the salt during the coprecipitation procedure results in a reduction in particle density from about 1.2–1.4 g/cc (as determined from 14/30 mesh size particles) for a catalyst prepared in the absence of the salt, to about 0.6–1.0 g/cc for a catalyst prepared according to the present method. Hence, the density of an acidic solid oxide catalyst can be controlled by the addition of ammonium sulfate during coprecipitation of the components of the catalyst, without any adverse effect on the activity of the catalyst.

What is claimed is:

1. A method for preparing an acidic solid oxide catalyst of reduced particle density and enhanced paraffin isomerization capability, which is essentially free of sulfate ions and comprises a Group IVB metal oxide modified with an anion or oxyanion of a Group VIB metal, said method comprising the steps of:

(a) coprecipitating a Group IVB metal oxide with an anion or oxyanion of a Group VIB metal in the presence of ammonium sulfate to obtain a sulfate-containing catalyst;

(b) steaming the sulfate-containing catalyst;

(c) recovering the sulfate-containing catalyst by filtration;

(d) washing the sulfate-containing catalyst with water in order to remove the sulfate ions;

(e) calcining the catalyst, which is now essentially free of sulfate ions.

2. The method according to claim 1, wherein the amount of ammonium sulfate used in step (a) is such that the ratio of sulfate anion to tungsten in solution is from about 0.1 to 20.

3. The method according to claim 1, wherein the Group IVB metal oxide is coprecipitated with the anion or oxyanion of the Group VIB metal in the presence of ammonium sulfate at a temperature of from about 0° to 200° C.

4. The method according to claim 1, wherein the sulfate-containing catalyst is calcined at a temperature of about 750° to 850° C.

5. The method according to claim 4, wherein the sulfate-containing catalyst is calcined at about atmospheric pressure for about 1.0 to 10 hours.

6. The method according to claim 1, wherein the acidic solid oxide catalyst that is essentially free of sulfate ions contains about 0.1 percent by weight or less of sulfur based on the total weight of the catalyst.

7. The method according to claim 1, wherein said Group IVB metal is zirconium and said Group VIB metal is tungsten.

8. A method for preparing an acidic solid oxide catalyst comprising tungstate-modified zirconia, said method comprising the steps of:

(a) combining a first liquid solution with a second liquid solution, said first solution comprising a source of zirconia and ammonium sulfate dissolved in water and said second solution comprising a source of tungstate dissolved in water;

(b) maintaining the combined solutions of step (a) under conditions sufficient to coprecipitate a sulfate-containing catalyst;

(c) steaming the sulfate-containing catalyst;

(d) recovering the sulfate-containing catalyst by filtration;

(e) washing the sulfate-containing catalyst with water in order to remove the sulfate ions;

(f) calcining the catalyst, which is now essentially free of sulfate ions.

9. The method according to claim 8, wherein said source of zirconia is $ZrOCl_2$.

10. A method according to claim 9, wherein said source of tungstate is ammonium metatungstate.

11. A method according to claim 8, wherein the combined solutions of step (b) are maintained at a pH of about 9.

12. A method according to claim 8, wherein said second liquid solution further comprises ammonium hydroxide.

13. The method according to claim 8, wherein the amount of ammonium sulfate used in step (a) is such that the ratio of sulfate anion to tungsten in solution is from about 0. 1 to 20.

14. The method according to claim 8, wherein the Group IVB metal oxide is coprecipitated with the anion or oxyanion of the Group VIB metal in the presence of ammonium sulfate at a temperature of from about 0° to 200° C.

15. The method according to claim 8, wherein the sulfate-containing catalyst is calcined at a temperature of about 750° to 850° C.

16. The method according to claim 15, wherein the sulfate-containing catalyst is calcined at about atmospheric pressure for about 1.0 to 10 hours.

17. The method according to claim 8, wherein the acidic solid oxide catalyst that is essentially free of sulfate ions contains about 0.1 percent by weight or less of sulfur based on the total weight of the catalyst.

18. The method according to claim 8, further comprising the step of incorporating an iron component into the sulfate-containing catalyst or the acidic solid oxide catalyst that is essentially free of sulfate ions.

19. The method according to claim 8, wherein the first and second liquid solutions of step (a) are further combined with a third liquid solution comprising iron.

20. An acidic solid oxide catalyst prepared according to the method of claim 8.

* * * * *